United States Patent [19]

Albarda et al.

[11] Patent Number: 4,985,165

[45] Date of Patent: Jan. 15, 1991

[54] MATERIAL HAVING A PREDETERMINABLE MAGNETIC SUSCEPTIBILITY

[75] Inventors: Scato Albarda, Am Bruchem, Netherlands; Helge Frank; Joachim Marcoll, both of Lübeck, Fed. Rep. of Germany

[73] Assignee: Drägerwerk Aktiengesellschaft, Lübeck, Fed. Rep. of Germany

[21] Appl. No.: 442,299

[22] Filed: Nov. 28, 1989

[30] Foreign Application Priority Data

Dec. 3, 1988 [DE] Fed. Rep. of Germany ....... 3840848

[51] Int. Cl.$^5$ .............................................. C04B 35/04

[52] U.S. Cl. .............................. 252/62.54; 252/62.59; 523/218; 73/25.02

[58] Field of Search .......................... 252/62.54, 62.59; 324/201, 204; 73/27 R, 27 A; 523/218

[56] References Cited

U.S. PATENT DOCUMENTS

| | | | |
|---|---|---|---|
| 3,742,344 | 6/1973 | Hummel | 324/201 |
| 3,826,974 | 7/1974 | Kocache et al. | 324/201 |
| 3,879,658 | 4/1975 | Hummel | 324/201 |
| 4,218,141 | 8/1980 | Mayer | 73/27 R |
| 4,360,441 | 11/1982 | Borelli et al. | 252/62.59 |
| 4,574,264 | 3/1986 | Takahashi et al. | 73/27 R |
| 4,619,868 | 10/1986 | Okita et al. | 252/62.54 |
| 4,687,710 | 8/1987 | Ogawa et al. | 252/62.54 |
| 4,763,509 | 8/1988 | Albarda et al. | 73/25.02 |
| 4,807,463 | 2/1989 | Ostermeir | 324/204 |
| 4,808,922 | 2/1989 | Eder et al. | 324/204 |

*Primary Examiner*—Karl Group
*Assistant Examiner*—Paul Marcantoni
*Attorney, Agent, or Firm*—Walter Ottesen

[57] ABSTRACT

The invention is directed to a material having predeterminable magnetic suceptibility and this material is suitable for producing displacing bodies for oxygen measuring devices. The material is composed of a plastic mass as primary substance and binding agent and, in any desired mixing ratio, at least one of the following additive substances: small hollow bodies, a paramagnetic material and a light ferromagnetic material.

8 Claims, No Drawings

MATERIAL HAVING A PREDETERMINABLE MAGNETIC SUSCEPTIBILITY

BACKGROUND OF THE INVENTION

Measuring apparatus are known which utilize the paramagnetic characteristic of oxygen to measure the oxygen content of gases. Since the paramagnetic effect is small, the difference is always measured between the signal generated by the measured gas and the signal which is generated by a means for displacing the measured gas. The means displacing the measured gas is a displacing body in dumbbell devices and in induction devices which moves in a magnetic field. Such devices are disclosed, for example, in U.S. Pat. Nos. 4,763,509 and 4,808,922. The invention relates to a material for producing such a displacing body.

In dumbbell devices, the displacing body is produced as a dumbbell-shaped body comprising two small hollow glass balls which are interconnected by a glass fiber. This production process is complex and the displacing body is mechanically very sensitive. The dumbbell shape of the displacing body further compels a specific configuration of the pole shoes of the magnet which generates the magnetic field required for measuring the oxygen content of the measuring gas. This configuration is disadvantageous since the magnetic field generated thereby is weak.

The displacing body for induction devices has the form of a rotating cuvette which has one or more chambers for the gas to be investigated. In order that the cuvette itself does not generate any spurious signal, it is necessary that the same quantity of cuvette material always be disposed in the magnetic field during rotation of the cuvette when the magnetic susceptibility of the cuvette material is non-vanishing. This requires very tight manufacturing tolerances and requires a specific configuration of the cuvette. Furthermore, the cuvette material must have a high degree of homogeneity.

The following requirements are imposed on an optimal displacing body:

(a) the displacing body must have an adequate mechanical strength and a volume which is as constant as possible and which is not dependent in an unpredictable manner from gas pressure, temperature, humidity or chemical influences;

(b) the magnetic susceptibility of the displacing body must be as constant as possible;

(c) the displacing body should be economically producible in a form which allows for an optimal formation of the magnetic field;

(d) the displacing body should be as light as possible since the shock sensitivity of the measuring device is thereby reduced and the response time is improved; and, (e) the magnetic susceptibility of the displacing body should be close to zero since it will then not be necessary to impose requirements on the consistency of the magnetic field needed for the measurement which are too high.

SUMMARY OF THE INVENTION

It is an object of the invention to provide a material from which a displacing body can be produced which meets the requirements (a) to (e) as well as possible.

The material of the invention has a predeterminable magnetic susceptibility. The material includes: a plastic mass as primary substance and binding agent; at least one additive substance selected from the group consisting of small hollow balls, a paramagnetic material and a slightly ferromagnetic material; and, the plastic mass and the additive substance being in any desired mixing ratio.

In this material, the plastic mass serves as a binder and as the primary material. The hollow bodies do the following: make the material stable as to form and dimensions; reduce the density with respect to pure plastic; reduce the magnetic susceptibility of the plastic (in this way, fewer of the further additive substances are required which are often expensive); and, they reduce the dielectric constant of the material. A low dielectric constant improves the characteristics of the displacing body when using a magnetic alternating field in the measuring device.

Displacing bodies for oxygen measuring devices are easily produced in the desired configuration from the material described above in that the material is poured into a suitable mold and then cures in the mold. In this way, a material is obtained from a material mixture having a susceptibility which can already be determined during its preparation and which no longer changes even during subsequent machining up to the completed displacing body or other desired assembly form.

The plastic mass can be epoxy resin. For the hollow balls, hollow glass balls are preferably used having a diameter in the range between 30 to 180 micrometers and having a wall thickness of approximately 1.5 micrometers. Paramagnetic materials which are suitable are principally the following: titanium (IV) oxide, cerium (IV) oxide and samarium (III) oxide. The light ferromagnetic material can be ferriphosphate ($FePO_4$).

The proportion of paramagnetic material or of light ferromagnetic material with respect to the entire mixture determines its magnetic susceptibility. Accordingly, it is possible to impart a magnetic susceptibility of zero to the mixture or another desired constant value within specific limits.

For oxygen measuring devices, it can be advantageous if a specific oxygen partial pressure of the measuring gas (such as 210 mbar) generates a zero signal. Deviations from this oxygen content can then be detected with great sensitivity. This zero signal can be generated by imparting a specific magnetic susceptibility to the displacing body when the oxygen content deviates from zero. This adjustment of the magnetic susceptibility is possible within specific limits by a suitable selection of the content of, for example, samarium (III) oxide.

DESCRIPTION OF A PREFERRED EMBODIMENT OF THE INVENTION

The invention will now be described with respect to an example. The material of this example shows a vanishing susceptibility and has a composition of: 67.81% by weight of epoxy resin ARALDIT, 13.56% by weight of a hardener HY 956 produced by Ciba-Geigy, 17.63% by weight of hollow glass balls having a diameter in the range of 30 to 180 micrometers, and 1.0% by weight of ferriphosphate. Suitable hollow glass balls are, for example, available from Emerson & Cuming, a corporation organized and doing business in the United States of America, and are described in the Technical Bulletin 14-2-2 of this company. The ferriphosphate adjusts the magnetic susceptibility of the material to zero.

It is understood that the foregoing description is that of the preferred embodiments of the invention and that various changes and modifications may be made thereto without departing from the spirit and scope of the invention as defined in the appended claims.

What is claimed is:

1. A rigid material having a magnetic susceptibility, the material comprising:

a plastic mass as primary substance and binding agent, an additive substance including a paramagnetic material having a first magnetic susceptibility and a plurality of small hollow balls made of a material having a second magnetic susceptibility less than said first magnetic susceptibility;

said small hollow balls having a diameter smaller than the size of a workpiece made of the material; and, said plastic mass and said additive substance being mixed in a mixing ratio for forming a rigid structure for the workpiece.

2. The material of claim 1, said plastic means being epoxy resin.

3. The material of claim 1, said small hollow balls being hollow glass balls.

4. The material of claim 3, said hollow glass balls having a diameter in the range of 30 to 180 micrometers and having a wall thickness of approximately 1.5 micrometers.

5. The material of claim 1, said paramagnetic material being samarium (III) oxide ($Sm_2O_3$).

6. The material of claim 1, said paramagnetic material being ferriphosphate ($FePO_4$).

7. The material of claim 3, wherein the additive substance includes 68 percent by weight of an epoxy resin, 13 percent by weight of a hardener and 18 percent by weight of said hollow glass balls having a diameter in the range of 30 to 180 micrometers and 1 percent by weight of ferriphosphate whereby a vanishing magnetic susceptibility is obtained.

8. In an apparatus for measuring the oxygen content of a gas which includes a displacing body for displacing the gas through the apparatus, a rigid material having a magnetic susceptibility, the material comprising:

a plastic mass as primary substance and binding agent, an additive substance including a paramagnetic material having a first magnetic susceptibility and a plurality of small hollow balls made of a material having a second magnetic susceptibility less then said first magnetic susceptibility;

said small hollow balls having a diameter smaller than the size of the displacing body; and, said plastic mass and said additive substance being mixed in a mixing ratio to provide a rigid structure for the displacing body.

* * * * *

UNITED STATES PATENT AND TRADEMARK OFFICE
CERTIFICATE OF CORRECTION

PATENT NO. : 4,985,165

DATED : January 15, 1991

INVENTOR(S) : Scato Albarda, Helge Frank and Joachim Marcoll

It is certified that error appears in the above-identified patent and that said Letters Patent is hereby corrected as shown below:

In column 3, line 20: delete "means" and substitute -- mass -- therefor.

In column 4, line 20: delete "then" and substitute -- than -- therefor.

Signed and Sealed this

Second Day of June, 1992

*Attest:*

DOUGLAS B. COMER

*Attesting Officer* *Acting Commissioner of Patents and Trademarks*